United States Patent
Ramasamy

(10) Patent No.: US 11,284,217 B2
(45) Date of Patent: Mar. 22, 2022

(54) METHOD AND APPARATUS FOR CROWDSOURCING THE LOCATION OF MOBILE TERRESTRIAL TRANSPORTS

(71) Applicant: QUALCOMM Incorporated, San Diego, CA (US)

(72) Inventor: Bala Ramasamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 16/708,786

(22) Filed: Dec. 10, 2019

(65) Prior Publication Data

US 2020/0120445 A1  Apr. 16, 2020

Related U.S. Application Data

(62) Division of application No. 15/794,217, filed on Oct. 26, 2017, now Pat. No. 10,547,977.

(51) Int. Cl.
*H04W 4/02* (2018.01)
*H04W 4/80* (2018.01)
(Continued)

(52) U.S. Cl.
CPC ............ *H04W 4/027* (2013.01); *G01C 21/14* (2013.01); *G01C 21/3423* (2013.01);
(Continued)

(58) Field of Classification Search
CPC ....... H04W 4/027; H04W 4/42; H04W 4/024; H04W 4/029; H04W 4/80; H04W 4/40;
(Continued)

(56) References Cited

U.S. PATENT DOCUMENTS

2011/0306360 A1 * 12/2011 Alizadeh-Shabdiz ...................... H04W 64/00 455/456.1
2014/0003327 A1   1/2014 Seo et al.
(Continued)

OTHER PUBLICATIONS

Ilarri S., et al., "Semantic Management of Moving Objects: A Vision Towards Smart Mobility", Expert Systems with Applications, Oxford, GB, vol. 42, No. 3, Sep. 8, 2014 (Sep. 8, 2014), pp. 1418-1435, XP029095182, ISSN: 0957-4174, DOI: 10.1016/J.ESWA.2014.08. 057.
(Continued)

*Primary Examiner* — Srilakshmi K Kumar
*Assistant Examiner* — Umair Ahsan

(57) ABSTRACT

Techniques are provided which may be implemented using various methods and/or apparatuses in a mobile device to crowd source mobile terrestrial transceiver identifiers associated with mobile terrestrial transports. In an embodiment, transceiver identifiers associated with mobile terrestrial transports may be identified and tracked through the detection and measurement of signals transmitted by mobile terrestrial transceivers received either by mobile devices located on the mobile terrestrial transport or through the detection and measurement of transient signals transmitted by passing mobile terrestrial transceivers received by stationary or near stationary mobile devices. The identity of detected mobile terrestrial transceivers and their locations and time observed may be uploaded to a server. The crowdsourced location and schedule information for the mobile terrestrial transports may be downloaded to mobile devices to provide transportation information such as arrival times, departure alerts, targeted stop alerts and other transport related functionality.

12 Claims, 8 Drawing Sheets

(51) Int. Cl.
| | |
|---|---|
| *H04W 4/024* | (2018.01) |
| *H04W 4/029* | (2018.01) |
| *G01S 5/02* | (2010.01) |
| *H04W 4/42* | (2018.01) |
| *G01C 21/34* | (2006.01) |
| *H04W 64/00* | (2009.01) |
| *H04W 4/40* | (2018.01) |
| *G01C 21/14* | (2006.01) |
| *G06Q 10/02* | (2012.01) |
| *G06Q 50/30* | (2012.01) |
| *G01C 21/36* | (2006.01) |
| *H04W 4/18* | (2009.01) |

(52) U.S. Cl.
CPC .......... *G01S 5/0221* (2013.01); *G01S 5/0236* (2013.01); *G01S 5/0252* (2013.01); *G01S 5/0284* (2013.01); *G01S 5/0294* (2013.01); *G06Q 10/025* (2013.01); *G06Q 50/30* (2013.01); *H04W 4/02* (2013.01); *H04W 4/023* (2013.01); *H04W 4/024* (2018.02); *H04W 4/026* (2013.01); *H04W 4/029* (2018.02); *H04W 4/40* (2018.02); *H04W 4/42* (2018.02); *H04W 4/80* (2018.02); *H04W 64/00* (2013.01); *G01C 21/3667* (2013.01); *H04W 4/185* (2013.01)

(58) Field of Classification Search
CPC ....... H04W 4/02; H04W 4/023; H04W 4/026; H04W 64/00; H04W 4/185; G01C 21/14; G01C 21/3667; G01S 5/0221; G01S 5/0236; G01S 5/0252; G01S 5/0284; G01S 5/0294; G06Q 10/025; G06Q 50/30
See application file for complete search history.

(56) References Cited

U.S. PATENT DOCUMENTS

| | | |
|---|---|---|
| 2014/0045556 A1 | 2/2014 | Subramanian et al. |
| 2014/0162544 A1 | 6/2014 | Edge |
| 2014/0364138 A1 | 12/2014 | Huang et al. |
| 2016/0078762 A1* | 3/2016 | Jouaux .................. G08G 1/123 701/117 |
| 2017/0078851 A1 | 3/2017 | Agrawal et al. |
| 2017/0150360 A1 | 5/2017 | Caldwell et al. |
| 2017/0230883 A1 | 8/2017 | Dang |
| 2018/0003795 A1 | 1/2018 | Suzuki |
| 2019/0132703 A1 | 5/2019 | Ramasamy |

OTHER PUBLICATIONS

International Search Report and Written Opinion—PCT/US2018/053424—ISA/EPO—dated Nov. 29, 2018.

Kostakos V., et al., "Wireless Detection of End-to-End Passenger Trips on Public Transport Buses", 13th International IEEE Conference on Intelligent Transportation Systems (ITSC), IEEE, Piscataway, NJ, USA, Sep. 19, 2010 (Sep. 19, 2010), pp. 1795-1800, XP031792606, ISBN: 978-1-4244-7657-2.

Pengfei Z., et al., "How Long to Wait? Predicting Bus Arrival Time with Mobile Phone Based Participatory Sensing", IEEE Transactions on Mobile Computing, IEEE Service Center, Los Alamitos, CA, US, vol. 13, No. 6, Jun. 1, 2014 (Jun. 1, 2014), pp. 1228-1241, XP011550149, ISSN: 1536-1233, DOI: 10.1109/TMC.2013.136 [retrieved on Jun. 2, 2014].

* cited by examiner

METHOD AND APPARATUS FOR CROWDSOURCING THE LOCATION OF MOBILE TERRESTRIAL TRANSPORTS

REFERENCE TO PRIOR APPLICATIONS

This application is a division of prior U.S. application Ser. No. 15/794,217, filed Oct. 26, 2017, granted as U.S. Pat. No. 10,547,977, entitled "Method and Apparatus for Crowdsourcing the Location of Mobile Terrestrial Transports," which is assigned to the assignee hereof and expressly incorporated herein by reference.

BACKGROUND

1. Field

The subject matter disclosed herein relates to electronic devices, and more particularly to methods and apparatuses for use in or with a mobile device to facilitate passive location of transport vehicles such as trains, buses and planes.

2. Information

Crowdsourcing may be utilized to locate transceivers in a fixed terrestrial location; however, location information for mobile terrestrial transceivers is generally considered unreliable. The crowdsourcing techniques rely on measuring signal strength, timing or combination thereof of terrestrial transceivers from a known location. When this information is measured from a plurality of locations, the location of the terrestrial transceiver may be determined. Observed terrestrial transceivers that appear to move location are discarded as unreliable location references. For example, APs running on wireless phones, do not provide an accurate, reliable location reference because the location of the phone at any point in time may vary and is generally unreliable.

SUMMARY

Some example techniques are presented herein which may be implemented in various method and apparatuses in a mobile device to crowd source mobile terrestrial transceiver identifiers and locations associated with mobile terrestrial transports. In various embodiments, transceiver identifiers associated with mobile terrestrial transports and the locations of the mobile terrestrial transports may be identified and tracked through the detection and measurement of signals transmitted by co-located mobile terrestrial transceivers.

In accordance with an example implementation, a method may be provided which comprises, determining, by the mobile device, at least one location of the mobile device; determining, by the mobile device, that the mobile device is on a mobile terrestrial transport; determining, by the mobile device, that at least one transceiver identifier is associated with the mobile terrestrial transport based upon at least one signal received from at least one mobile terrestrial transceiver; and uploading, by the mobile device, the at least one transceiver identifier and the at least one location to a crowd source server.

In accordance with an example implementation, an apparatus may be provided for use in a mobile device. The apparatus may comprise: a wireless transceiver; one or more processing units coupled to the wireless transceiver, the one or more processing units configured to: determine at least one location of the mobile device; determine that the mobile device is on a mobile terrestrial transport; identify at least one transceiver identifier associated with the mobile terrestrial transport based upon at least one signal received from at least one mobile terrestrial transceiver; upload, via the wireless transceiver, the at least one transceiver identifier and the at least one location to a crowd source server.

In accordance with an example implementation, an apparatus may be provided for use in a mobile device. The apparatus may comprise: means for determining, by the mobile device, at least one location of the mobile device; means for determining, by the mobile device, that the mobile device is on a mobile terrestrial transport; means for determining, by the mobile device, that at least one transceiver identifier is associated with the mobile terrestrial transport based upon at least one signal received from at least one mobile terrestrial transceiver; and means for uploading, by the mobile device, the at least one transceiver identifier and the at least one location to a crowd source server.

In accordance with an example implementation, a method may be provided which comprises, performing, by the mobile device, at least one wireless scan for transceiver signals; determining, by the mobile device, at least one location of the mobile device; identifying, by the mobile device, at least one transient signal and an at least one associated transceiver identifier; and uploading to a crowd source server, by the mobile device, the at least one location of the mobile device, a time associated with the at least one wireless scan, and the at least one associated transceiver identifier.

In accordance with an example implementation, an apparatus may be provided for use in a mobile device. The apparatus may comprise: one or more processing units; and a wireless transceiver coupled to the one or more processing units; and configured to: perform at least one wireless scan for transceiver signals; determine at least one location of the mobile device; identify at least one transient signal and an at least one associated transceiver identifier; upload the at least one location of the mobile device, a time associated with the at least one wireless scan and the at least one associated transceiver identifier.

In accordance with another example implementation, an apparatus may be provided for use in a mobile device. The apparatus may comprise: means for performing at least one wireless scan for transceiver signals; means for determining at least one location of the mobile device; means for identifying at least one transient signal and an at least one associated transceiver identifier; and means for uploading the at least one location of the mobile device, a time associated with the at least one wireless scan and the at least one associated transceiver identifier.

Non-limiting and non-exhaustive aspects are described with reference to the following figures, wherein like reference numerals refer to like parts throughout the various figures unless otherwise specified.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
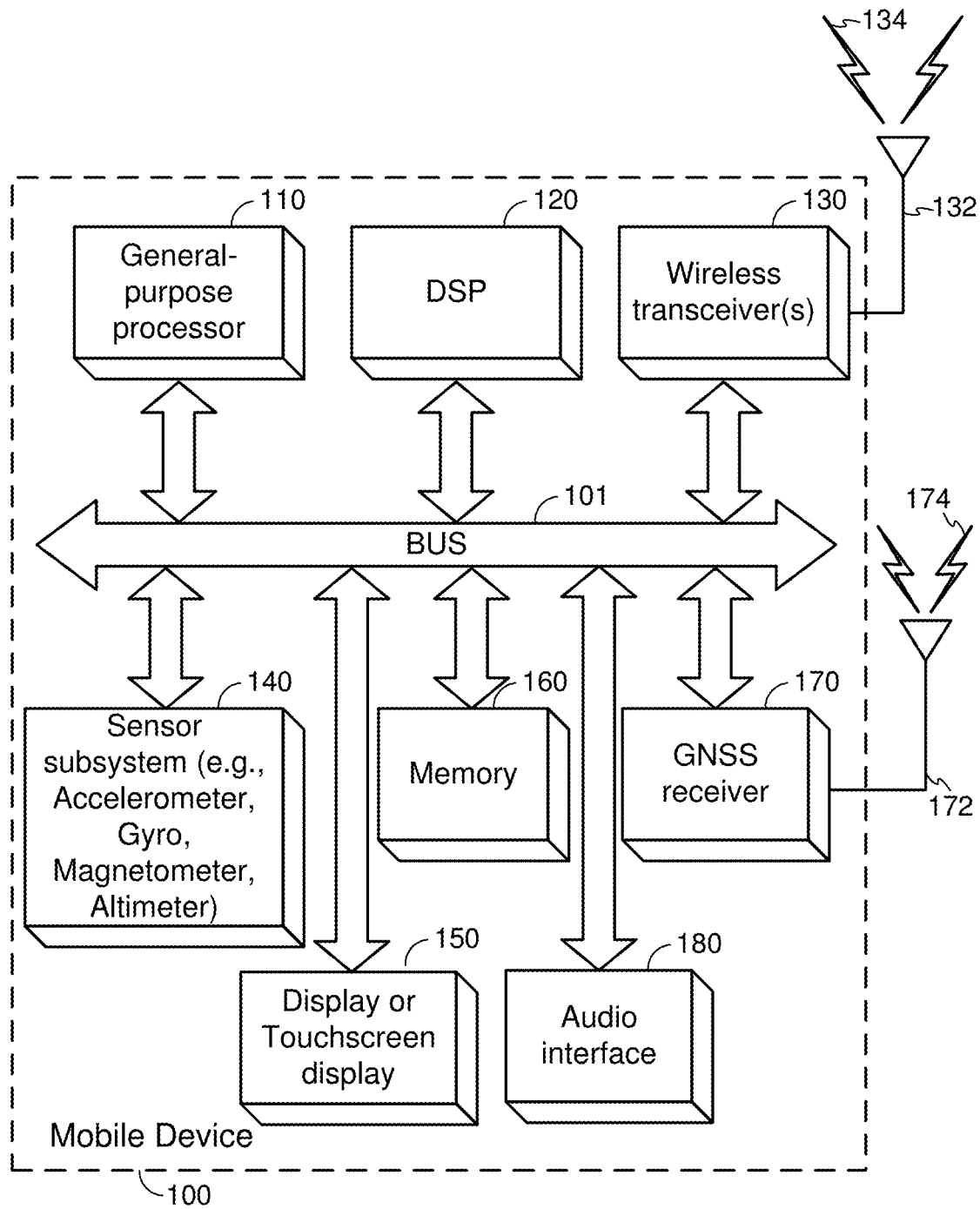
FIG. 1 is a block diagram of an exemplary mobile device capable of detecting wireless signals and of determining the location of the mobile device.

Some example techniques are presented herein which may be implemented in various methods, means and apparatuses in a mobile device and in a crowd sourcing and information delivery system. Example techniques presented herein address various methods and apparatuses in a mobile device to provide for or otherwise support the crowd sourcing of and the display of transit-related information. Example techniques described herein may generally apply to crowd sourcing of information related to mobile access points that travel in scheduled or otherwise predictable manners on known routes. Example techniques and embodiments are provided for crowd-sourcing, tracking, predicting and displaying information related to mobile access points or other mobile terrestrial transceivers.

In the case of moving transports, co-located transceivers, such as on-board access points or other transceivers, in an embodiment, accessing a data connection through either satellite or wide area network (WAN), may provide useful information, both for occupants on the transport relating to the location of a device within a transport and for persons and devices external to the transport relating to the location and timing of the transport, where such information is not otherwise available, and, in an embodiment, providing an additional predictable signal reference for use in location determination. Such a signal reference could prove useful in rural or other areas where terrestrial transceiver density is low such as in rural or wilderness areas. In a low signal density area, multiple signal measurements from a moving terrestrial transceiver, or multiple moving terrestrial transceivers, may be utilized to provide sufficient signal measurements to trilaterate or otherwise determine a location. In an embodiment, the location of the moving terrestrial transceiver may be known or determined based upon travel utilizing a predictable route at a specific time. In an embodiment, the location of the moving transport may be determined by the moving transport, perhaps by an on board GNSS system or other location means, and may be transmitted along with identification information, to mobile devices for use in determining their location.

The location of many public transit vehicles is scheduled along a fixed route at pre-determined or at least approximately determined times. However, the adherence of public vehicles to any given schedule may be subject to weather, traffic, obstacles, scheduling issues and other delay factors. While some transit vehicles contain GPS tracking or other tracking means, and regularly send updated locations to a tracking server, other transit vehicles may not be enabled or, in some cases, the tracking data may not be shared with public information platforms or made available to online application platforms. These and other issues may be addressed by verifying the location of transit vehicles through crowdsourcing the location of a co-located transceiver (e.g., a wireless transceiver that is located on the transit vehicle), either via an onboard transceiver or via devices in the vicinity of the transit vehicle or both, or via extrapolation from the location of co-located devices at known times, based on predictable or crowd-sourced velocities.

FIG. 1 illustrates an embodiment of a mobile device, a non-limiting example for implementing the various methods and techniques illustrated in the figures and text herein. As shown in FIG. 1, in an embodiment, mobile device 100, which may also be referred to as a UE (or user equipment), may include a general-purpose processor 110. The general-purpose processor 110 may sometimes be referred to by other names such as an applications processor, a general processor, a main processor or a processor. Various functionality may run on the general-purpose processor 110 such as applications, operating system functions and general mobile device functions. General-purpose processor 110 may also include processors, including additional processors, that perform more specialized functionality, or parts thereof, such as processing related to camera sensors, video, audio and wireless signal processing such as wireless baseband processors. In an embodiment, mobile device 100 may also include a DSP 120, which may be used for various compute processing tasks such as video and graphical processing, display management, GNSS signal processing, WAN signal processing and Wi-Fi signal processing. Some tasks may, in some embodiments, be split between the general-purpose processor and one or more DSPs such as location determination, where signal search, processing and correlation may happen at the DSP level while location determination may be calculated at the general-purpose processor 110.

In mobile device 100, wireless transceiver(s) 130 may support various wide area network (WAN) connections (e.g., Global System for Mobile Communications (GSM), Code Division Multiple Access (CDMA), Wideband CDMA (WCDMA), Long Term Evolution (LTE), $5^{th}$ Generation Wireless (5G) or new radio access technology (NR), High Rate Packet Data (HRPD)), wireless LAN connections (e.g., Wi-Fi/802.11) and personal area network (PAN) connections (e.g., Bluetooth and Zigbee) or combinations thereof. Wireless transceiver(s) 130 may be implemented by multi-mode transceivers, discrete transceivers, separate or shared antennas (132) or various combinations thereof.

Mobile device 100 may contain a GNSS receiver (170) and GNSS antenna 172. The GNSS receiver 170 may measure various signals 174 received from satellites belonging to an SPS or Global Navigation Satellite System (GNSS) such as GPS, GLONASS, Galileo or Beidou. These signal measurements may be utilized to determination location either alone or in combination with terrestrial signals such as WAN, WLAN and PAN signals.

Mobile device 100 may include various sensors and may, in some embodiments be discrete or in some embodiments, be integrated into a sensor subsystem 140. Sensors may include, in various embodiments, accelerometers such as 3D accelerometers, gyros such as 3D gyros, and magnetometers, often used alone or in combination to determine dead reckoning output such as heading, distance, and orientation.

Sensors may be used, in an embodiment to determine velocity and acceleration and/or used to determine step count and gait. Other sensors, in an embodiment, may include camera sensors, light sensors, and pressure sensors or other altimeters or other sensor types such as medical and chemical sensors.

Mobile device 100 may include a display. In some embodiments, the display may be a touchscreen, used for both visual output and touch-driven input. The display be associated with a virtual keyboard on the display, sometimes on demand, or by an actual keyboard, for character input. Mobile device 100 may include an audio interface 180, including in various embodiments, speakers and associated drivers, for audio output and one or more microphones for audio input. In an embodiment, audio input may be associated with voice recognition, either implemented on the mobile device 100 or on a server 300. Mobile device 100 may also include memory 160, which may comprise FLASH, RAM, ROM, disc drive, or FLASH card or other memory devices or various combinations thereof.

Figure 2:
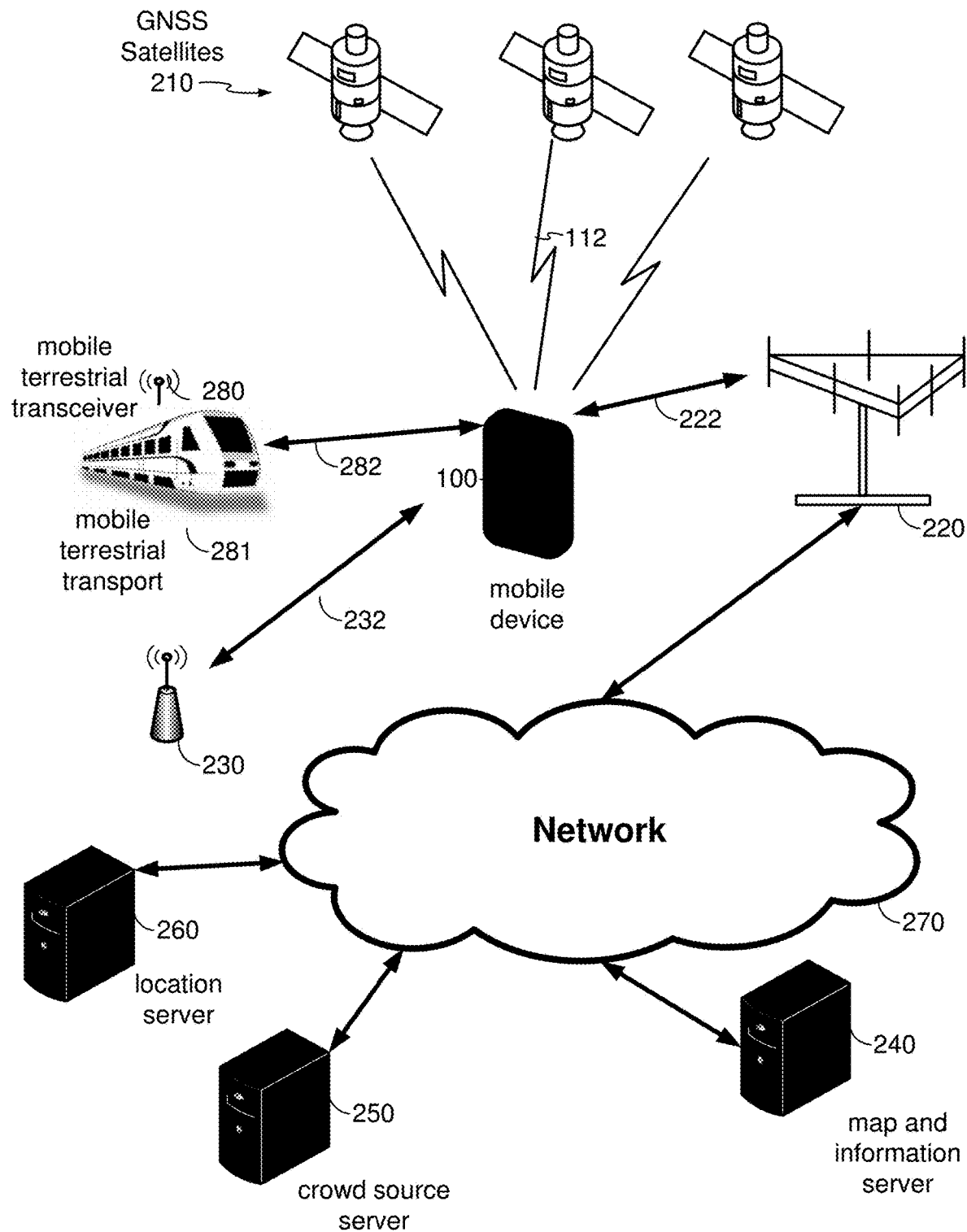
FIG. 2 is a system diagram including wireless-capable mobile devices and network-based servers.

FIG. 2 illustrates a system and means for implementing the various methods and techniques described in the figures and text herein. As shown in FIG. 2, in an embodiment, mobile device 100, which may also be referred to as a UE (or user equipment), may transmit radio signals to, and receive radio signals from, a wireless communication network. In one example, mobile device 100 may communicate, via wide area network (WAN) wireless transceiver 220 and wireless antenna 132 with a cellular communication network by transmitting wireless signals to, or receiving wireless signals from a WAN wireless transceiver 220 which may comprise a wireless base transceiver subsystem (BTS), a Node B or an evolved NodeB (eNodeB) or a next generation NodeB (gNodeB) over wireless communication link 222. Similarly, mobile device 100 may transmit wireless signals to, or receive wireless signals from WLAN or PAN transceiver 230 over wireless communication link 232. In an embodiment, mobile device 100 may transmit wireless signals to, or receive wireless signals from a mobile terrestrial transceiver 280 over wireless communication link 232. A WLAN or PAN transceiver 230 and/or a mobile terrestrial transceiver 280 may comprise an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect. It is also understood that mobile terrestrial transceiver 280 may be located on various mobile platforms such as trains, boats, cars or other mobile terrestrial platforms. In an embodiment, it is understood that other terrestrial platforms or near terrestrial platforms (such as a drone or robot) may be a platform for a mobile terrestrial transceiver 280.

Examples of network technologies that may support wireless transceiver 130 are Global System for Mobile Communications (GSM), Code Division Multiple Access (CDMA), Wideband CDMA (WCDMA), Long Term Evolution LTE), $5^{th}$ Generation Wireless (5G) or New Radio Access Technology (NR), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. WAN wireless transceivers 220 may comprise deployments of equipment providing subscriber access to a wireless telecommunication network for a service (e.g., under a service contract). Here, a WAN wireless transceiver 220 may perform functions of a wide area network (WAN) or cell base station in servicing subscriber devices within a cell determined based, at least in part, on a range at which the WAN wireless transceiver 220 is capable of providing access service. Examples of WAN base stations include GSM™, WCDMA™, LTE™, CDMA™, HRPD™ WiFi™, BT, WiMax™, and/or $5^{th}$ Generation (5G) base stations. In an embodiment, further wireless transceiver 130 may comprise a wireless LAN (WLAN) and/or PAN transceiver. In an embodiment, mobile device 100 may contain multiple wireless transceivers including WAN, WLAN and/or PAN transceivers. In an embodiment, radio technologies that may support wireless communication link or links (wireless transceiver 130) further comprise Wireless local area network (e.g., WLAN, e.g., IEEE 802.11), Bluetooth™ (BT) and/or ZigBee™.

In an embodiment, mobile device 100, using wireless transceiver(s) 130, may communicate with servers 240, 250 and/or 260 over a network 270 through communication interface(s) 308. Here, network 270 may comprise any combination of wired or wireless connections and may include WAN wireless transceiver 220 and/or WLAN or PAN transceiver 230 and/or servers 240, 250 and/or 260. In an embodiment, network 270 may comprise Internet Protocol (IP) or other infrastructure capable of facilitating communication between mobile device 100 and servers 240, 250 and/or 260 through WLAN or PAN transceiver 230 or WAN wireless transceiver 220. In an embodiment, network 270 may comprise cellular communication network infrastructure such as, for example, a base station controller or packet based or circuit based switching center (not shown) to facilitate mobile cellular communication with mobile device 100. In an embodiment, network 270 may comprise local area network (LAN) elements such as Wi-Fi APs, routers and bridges and may in that case include or have links to gateway elements that provide access to wide area networks such as the Internet. In other implementations, network 270 may comprise a LAN and may or may not have access to a wide area network but may not provide any such access (if supported) to mobile device 100. In some implementations, network 270 may comprise multiple networks (e.g., one or more wireless networks and/or the Internet). In one implementation, network 270 may include one or more serving gateways or Packet Data Network gateways. In addition, one or more of servers 240, 250 and/or 260 may be a route and/or navigation server, a crowd source server, and/or a location server.

In various embodiments, and as discussed below, mobile device 100 may have circuitry and processing resources capable of obtaining location related measurements (e.g. for signals received from GPS, GNSS or other Satellite Positioning System (SPS) satellites 210, WAN wireless transceiver 220 or WLAN or PAN transceiver 230 and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of servers 240, 250 and/or 260) after which the location server may estimate or determine a location for mobile device 100 based on the measurements. In the presently illustrated example, location related measurements obtained by mobile device 100 may include measurements of signals (112) received from satellites belonging to an SPS or Global Navigation Satellite System (GNSS) (210) such as GPS, GLONASS, Galileo or Beidou and/or may include measurements of signals (such as 222 and/or 232) received from terrestrial transmitters fixed at known locations (e.g., such as WAN wireless transceiver 220). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference of Arrival (OT-DOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 240, 250 or 260 may be capable of providing positioning assistance data to mobile device 100 including, for example, information regarding signals to be measured (e.g., signal timing and/or signal strength), locations and identities of terrestrial transmitters, schedules and route of mobile terrestrial transceivers 280, and/or signal, timing and orbital information for GNSS satellites to facilitate positioning techniques such as A-GNSS, AFLT, OTDOA and E-CID. For example, servers 240, 250 or 260 may comprise an almanac which indicates locations, or route or location as a function of time for moving transmitters, and identities of wireless transceivers and/or local transceivers in a particular region or regions such as a particular venue, and may provide information descriptive of signals transmitted by a cellular base station or AP or mobile terrestrial transceiver such as transmission power and signal timing. In the case of E-CID, a mobile device 100 may obtain measurements of signal strengths for signals received from WAN wireless transceiver 220 and/or wireless local area network or PAN transceiver 230 and/or mobile terrestrial transceiver (MTT) 280 and/or may obtain a round trip signal propagation time (RTT) between mobile device 100 and a WAN wireless transceiver 220 or wireless WLAN or PAN transceiver 230 or MTT 280. A mobile device 100 may use these measurements together with assistance data (e.g. terrestrial almanac data or GNSS satellite data such as GNSS Almanac and/or GNSS Ephemeris information) received from a location server 260 to determine a location for mobile device 100 or may transfer the measurements to a location server 260 to perform the same determination.

In various embodiments, location related measurements comprising location and an indication or indications of WAN wireless transceiver(s) 220, wireless WLAN or PAN transceiver 230, or mobile terrestrial transceiver 280, by mobile device 100 may be transferred to a crowd source server 250. The location may be determined through various means, as described above. For example, in an embodiment, the mobile device 100 may determine its location with GNSS satellite signal measurements, with terrestrial transmitter signal measurements or some combination thereof. In an embodiment, the mobile device 100 may determine its location using accelerometers and/or gyros to determine, via dead reckoning, distance and direction traveled from the last known position. In an embodiment, the mobile device 100 may determine its location using a combination of signals and sensors; for example, a location may be determined using various signal measurements from GNSS and terrestrial transmitters and then updated using dead reckoning. From a determined location, various signal measurements can be taken from visible transmitters to obtain an indication of distance of the transmitter from a determined location. The indication of distance may include signal strength or round trip time or time of arrival or other distance estimation methods. New signal measurements may be taken at new determined locations. By combining indications of distance to any given transmitter taken from multiple locations, whether by one device or by a plurality of devices, the location of a transmitter, such as a WAN transceiver 220 or WLAN or PAN transmitter 230, may be determined. The location of the transmitter may be determined on mobile device 100 or on a crowd sourcing server 250 or on a location server 260 or other network-based server.

In some embodiments, measurements of transient signals or signals from moving transmitters, such as those from mobile phones or from vehicle-mounted transmitters, are discarded and/or ignored. However, in an embodiment, doppler measurements and/or distance measurements/indications (such as timing based measurements or signal strength measurements) of a signal emitted by a moving signal source, such as mobile terrestrial transceiver 280, may be utilized to determine the location, heading and/or speed of a moving signal source. Furthermore, in an embodiment, mobile terrestrial transceiver 280 may be located within or on top of a mobile transport such as a train or a bus or other vehicle that follows a regular route on a regular schedule. In the case of a mobile terrestrial transceiver 280, the normal frequency associated with the mobile terrestrial transceiver 280 is tied to a wireless standard such as IEEE 802.11 or LTE and to a deployed frequency band such as Cellular or PCS for cellular or 2.4 GHz, 3.6 GHz, 4.9 GHz, 5 GHz and 5.9 GHz for IEEE 802.11. The signals received at the mobile device from a moving transmitter, such as mobile terrestrial transceiver 280 in a moving train or bus or other vehicle, will be subject to a doppler shift which can be utilized to a) determine that mobile terrestrial transceiver 280 is in motion and, in some cases, determine the speed and even the heading of that motion. In the case of a mobile transport that follows a regular route on a regular schedule, or at least a mobile transport that follows a known route on a known schedule, the mobile device 100 can be utilized to determine a pairing between a mobile transport and a mobile terrestrial transceiver 280. In an embodiment, a mobile device 100 at a determined location, could also determine, based upon the strength and/or doppler shift of the signal received from mobile terrestrial transceiver 280 in mobile terrestrial transport 281 while traveling along a fixed route, the location of mobile terrestrial transport 281. For example, a train going by along a fixed route, containing a mobile terrestrial transceiver 280, would result in mobile device 100 receiving signals from mobile terrestrial transceiver 280, at a particular signal strength (or time delay or RTD or other indication of distance) at two positions, one when approaching the mobile device 100 and one when heading away from mobile device 100. However, the mobile device would receive different doppler results at each of the two positions. Thus, when the train is approaching, the frequency of signals from mobile terrestrial transceiver 280 would be shifted higher than the nominal communication frequency, and when the train is heading away from mobile device 100, the frequency of signals from mobile terrestrial transceiver 280 would be shifted lower, based on doppler. Therefore, once a pairing between a mobile terrestrial transceiver 280 and a mobile terrestrial transport 281 is known, the mobile device 100, when at a known location, can used to verify the location of the mobile transport and/or determine whether the mobile transport is delayed or is ahead of time relative to the crowd sourced and/or published schedule information.

In an embodiment, a mobile device 100 at a train station or a bus stop may determine its location using GNSS, wireless terrestrial transceivers, sensors or various combinations thereof, or any of the above-mentioned location techniques. Furthermore, the mobile device 100 may access map data, stored locally on the mobile device 100, or accessed remotely on a server, such as map and information server 240, to determine that mobile device 100 is located at or near to a transit hub, transit station or transit stop. If a transient signal is detected and measured from a location at or near to a transit hub, transit station or transit stop, and assuming that time information in addition to the location of the mobile device 100 and the signal measurement data for detectable transceiver signals is collected, the appearance of particular mobile terrestrial transceivers 280 can be determined as a function of time and location. The observed times and locations of mobile terrestrial transceivers 280 can then be correlated with publicly accessible route information or schedule information or both, to determine which transit vehicle or route or both is associated with a particular ID for a given mobile terrestrial transceiver. For example, if a particular SSID or MAC address is observed only at scheduled arrival times for a particular bus or train, or is observed at the scheduled stops for a particular route at times at least approximating scheduled stop times, the crowd-sourced signal, location and time data may be used to map the particular ID for a given mobile terrestrial transceiver 280 with a particular train or bus and/or route.

If there are multiple mobile terrestrial transceivers 280 at a given station (for example, at Tokyo Station in Japan), the proximity to particular waiting areas, the time of arrival and departure, and direction of travel (such as may be determined by multiple signal strength measurements, by measurements by multiple devices at different locations or by doppler measurements from a stationary mobile device 100 may be used to distinguish between different transports (trains, buses, cars, shuttles, etc.). In an embodiment, combining data from multiple stations can also be utilized to distinguish between different transports. In an embodiment, ambiguity in mapping between transports and transceiver IDs may be resolved through the use of signal detection of at least one of the IDs in question at one or more other stops or stations, where the ID-transport match may have been already determined or, where the combination of an ID being detected near or located at two or more stations on a prescheduled route, particularly at pre-scheduled times, can be used to associate a route and schedule with a particular mobile terrestrial transceiver 280. Matching times and locations of a particular mobile terrestrial transceiver 280 and, hence, a mobile transport, to a known route to eliminate ambiguity is particularly useful relative to differentiating between various mobile transports at large stations or transport hubs.

In an embodiment, the signal analysis and mapping between mobile terrestrial transceivers 280 and mobile transports 281 may be done on the mobile device 100, on the crowd source server 250, on other network server or on some combination thereof. For example, in an embodiment, the location, time information and signal measurement information may be sent to the crowd source server 250 by one or by a plurality of mobile devices 100. The crowd source server 250 or other server, in an embodiment, utilizing maps and information from a map and information server 240, may be utilized to determine the location of terrestrial transceivers such as WAN transceiver 220, wireless LAN or PAN transceiver 230, and/or mobile terrestrial transceiver 280 and, in an embodiment, to associate the locations of terrestrial transceivers to a map and/or to points of interest such as bus stops or depots, and train stations or stops. In an embodiment, the crowd source server 250 or other server, may determine the route and timing associated with mobile terrestrial transceivers 280 (and therefore of the mobile terrestrial transports that they are attached to/mounted on), by mapping the time, location and indication of mobile terrestrial transceiver 280 identification, such as MAC ID or base station ID (BSID). The combination of multiple observations of signals from mobile terrestrial transceivers 280 over time, from different locations along the route that the mobile terrestrial transport 281 is taking, is used to create a route map of locations traveled and the times that the mobile terrestrial transport 281 is at those locations. Similarly, individual observations of mobile terrestrial transceivers 280 may be utilized to place the mobile terrestrial transport 281 at a position along a route, where the route is already known.

Map and information server 240 may provide map information, public transit maps and public transit schedules, and transit routes and scheduled arrival and departure times of particular mobile transit vehicles to the crowd source server 250, which may be utilized to assist in the analysis of crowd source data from multiple mobile devices.

To assist in analysis of the crowd source data, the crowd source server 250 may group data measured, by mobile devices 100, at various transit hubs such as train stations, bus hubs, bus stops, airports, depots, and other locations where mass transit vehicles or other scheduled vehicles stop or congregate. The determination that the data was measured at a transit hub may be done on the mobile device, based on map information downloaded, for example, from map and information server 240, or the determination that the data was measured at a transit hub may be done at the crowd source server 250 as it analyzes the data, based upon the position of mobile device 100 that is sent to the crowd source server along with time of observation and signal measurements such as signal strength, round trip time, observed time delay or other indications of distance from the measuring mobile. The time of observation of transient signals can be combined with other measurements from the same or nearby locations to determine when a given transient signal is present at a location, and, in an embodiment, similarly determining time of arrival and departure. Also, in an embodiment, the mobile device may use an indication of distance to mobile terrestrial transceivers 280 and doppler measurements of mobile terrestrial transceivers 280 to assist in calculation of the location of the mobile device. This information may be particularly useful in indoor or underground scenarios. For example, the strongest measurement of a signal, or the lack of doppler shift or the minimum time delay measurement may be used to determine when the mobile terrestrial transceiver 280, and hence, the mobile terrestrial transport 281 is directly parallel to and passing the mobile device. The time that a transient signal is present and/or arrives and departs at a transit hub can be compared to known transport schedules to determine which transport, route and time is associated with a particular mobile terrestrial transceiver 280 identification (such as a media access control (MAC) address, service set identifier (SSID), base station ID or other identifier). In various embodiments, transport schedules are available online and may be downloadable by the crowd source server 250, or may be available directly from a transport authority or municipality. Transport schedules may contain locations of transport hubs and transport stops and time schedules for stops at each hub or stop for various routes. In an embodiment, transport schedules may have arrival time and/or departure times for each route that stops at a given transport hub or transport stop. In an embodiment, transport schedules may also have transport identifiers, although, in some cases the transport identifiers may be transient, changing from time to time or day to day. In an embodiment, transport identifiers may be based on the route (e.g., #7 bus, regardless of which bus is actually driving the route).

In an embodiment, crowd source server 250 associates transport route and schedule information with the crowd source data measured by mobile devices 100. Transient signals that are present only during a time period surrounding the time a mobile terrestrial transport 281 is scheduled to be present or anticipated to be present, can be associated with a particular mobile terrestrial transport 281 or with the route that the transport is scheduled to follow. If only arrival times are scheduled, or only departure times are scheduled, the transport may be assumed to be present for a reasonable time to allow for loading and unloading passengers and cargo. The estimated time that the average transport or even a specific transport spends at a stop or hub or station can be prespecified, particularly if actual crowd sourced data is not available. Once crowd sourced data is available, the estimated time that a transport spends at a stop can be specified with more accuracy, either as a system-wide average, a route-specific average, or on a stop by stop basis, which may also be transport specific. As crowd sourcing is ongoing, the mobile terrestrial transceiver 280 identifier that is associated with a given route may be updated, as vehicles may be replaced or rescheduled with other vehicles, each with its own mobile terrestrial transceiver 280 identifier. Note that signal measurements, time determination and location determination may be performed as a background task periodically or they may be associated with a particular application, such as a transport status or mapping application that would be used to provide transport status as well as to perform signal measurements, time determination and location determination during information requests.

Some mobile devices 100 will also be present on any given transport. In an embodiment, mobile devices 100 will run an application to provide map information or transport status or both. Again, signal measurements, time determination and location determination may be performed as a background task periodically or they may be associated with a particular application, such as a transport status or mapping application that would be used to provide transport status and updates and/or arrival and departure alerts as well as to perform signal measurements, time determination and location determination during information requests. To the extent that update and information applications remain active, signal measurements, time determination and location determination may be repeated periodically to monitor the location of the transport. Signal measurements, positioning results and time information may be utilized to determine that a mobile device 100 is on a mobile terrestrial transport 281 associated with one or more mobile terrestrial transceivers 280. If the presence on a transport is predetermined, such as through a ticket purchase or through embarkation times and embarkation location, the mobile device 100 may be automatically associated with a mobile terrestrial transceiver 280 located on the same transport. The determination may also be made through repetitive location updates or through doppler measurements that the mobile device 100 is on a transport on a particular route, and that one or more terrestrial transceivers are on the same transport, based upon relatively constant signal strength, timing or round-trip timing measurements from the mobile terrestrial transceiver as measured by mobile device 100. The location updates may then be paired with at least one mobile terrestrial transceiver 280 and, hence, with a particular mobile transport. The crowd sourced location information from one or more mobile devices 100 that are located on a mobile terrestrial transport 281 may then be combined, if necessary, such as through averaging, median values or in time sequential ordering to provide updates on the location of the mobile terrestrial transport 281. It is understood that these techniques would also apply to an aerial transport such as a plane and to airports (as transportation hubs), where mobile devices may use GNSS for location determination and send updates via a data connection, typically through the mobile transceiver, in this case on an airplane, such that the location of the airplane may be tracked.

It is further recognized that, particularly once the mobile terrestrial transceiver identification (ID) is associated with a particular terrestrial transport or route, that mobile devices near the route of the mobile terrestrial transport 281 may also be used to determine the location of any mobile terrestrial transport 281 that has a mobile terrestrial transceiver 280 with signals visible to the mobile device 100. In an embodiment, even if a mobile terrestrial transceiver identification (ID) is not yet associated with a particular terrestrial transport or route, transient signals measured near to the route may be used to both associate a mobile terrestrial transceiver identification (ID) with a route and/or with a transport and to determine the location of a transport, that can then be correlated with available scheduling information to determine the ID of the actual transport or route. These signals may be used for distance measurement, location determination of the transport, and, using repetitive measurements and/or doppler measurements, may, in an embodiment, be utilized to determine heading and velocity of the transport as well.

In an embodiment, the transport may also have location determination and report capability on board. The location of the transport may be made available to mobile devices 100 on the mobile terrestrial transport 281 or it may be available via the Internet, either via web-based access or via downloadable information. The transport location may be correlated with the location of mobile devices 100 onboard and hence, correlated with one or more mobile terrestrial transceivers, also onboard the same transport (co-located), based on detection of continuous presence of at least one signal from the co-located mobile terrestrial transceiver 280 as measured and/or detected by at least one co-located mobile device 100. Crowd sourcing information along the route may also be used to differentiate between a co-located mobile terrestrial transceiver 280 and a personal transceiver based on a mobile phone, for example, on a mobile phone being utilized as a Wi-Fi access point. The during of the signal and the duration of the association between the signal from the mobile terrestrial transceiver 280 and the route can be utilized to distinguish from temporarily co-located transceivers such as the mobile phone-based access point, and long term co-located transceivers such as a mobile terrestrial transceiver that is mounted or other installed in a mobile terrestrial transport 281 or other transport.

In an embodiment, mobile device 100 may receive crowd sourced location information for the mobile terrestrial transport 281 and may receive map information, route information and stop, hub and/or station location information from various servers such as from the crowd source server 250 or the map and information server 240 or from an application server or some combination thereof. The location information for the mobile terrestrial transport 281 and/or location of the mobile device 100 and, where available, speed information and/or historical information relative to location of the mobile terrestrial transport 281 on a route at a particular time may be used to generate alerts for mobile devices. For example, location of the a co-located mobile device 100 and/or location of the mobile terrestrial transport 281 may be used with crowd sourced and/or historical schedule information to determine when the mobile terrestrial transport 281 will arrive at a particular station or hub or stop, whether the mobile terrestrial transport 281 is on schedule or early or late, and by how much, or to generate an alert to the rider on the transport when the mobile terrestrial transport 281 is nearing a station or when the mobile terrestrial transport 281 is nearing a final destination, possibly based on a fixed distance or a pre-determined time before the mobile device 100 and the mobile terrestrial transport 281 arrives at the station, hub, stop or final destination. Similarly, an alert may be generated at a mobile device located at a station, hub or stop about the upcoming arrival of a selected mobile terrestrial transport 281. The selected mobile terrestrial transport 281 may be received via a user interface, or may be inferred based on location of the mobile device 100 at a particular platform, gate or stop, or may be determined based on an electronic ticket purchase or from an entry in a calendar on mobile device 100. The crowd sourced data for the mobile terrestrial transport 281 may be compared to the location of mobile device 100 and, based on real time progress of mobile terrestrial transport 281 or based on historical times to traverse the intervening distance on the route between the current location of the mobile terrestrial transport 281 and the mobile device 100, estimated time of arrival, remaining time until arrival and/or an alert at a select time or distance before arrival may be determined and/or implemented. The alert or alerts or route progress updates may be displayed via a display interface. In an embodiment, route progress may be displayed as an icon on a map or as a moving icon or arrow (showing heading and location) on a map. In an embodiment, route alerts and/or route progress may be displayed on popup windows on a display or via audio announcements or tones or alarms or via vibration or haptic alert or combination thereof.

A mobile device (e.g. mobile device 100 in FIG. 1) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, Wi-Fi, BT, WiMax™, Long Term Evolution (LTE), 5th Generation Wireless (5G) or new radio access technology (NR), etc. A mobile device may also support wireless communication using a wireless LAN (WLAN), personal area network (PAN) such as Bluetooth™ or ZigBee™, DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 3:
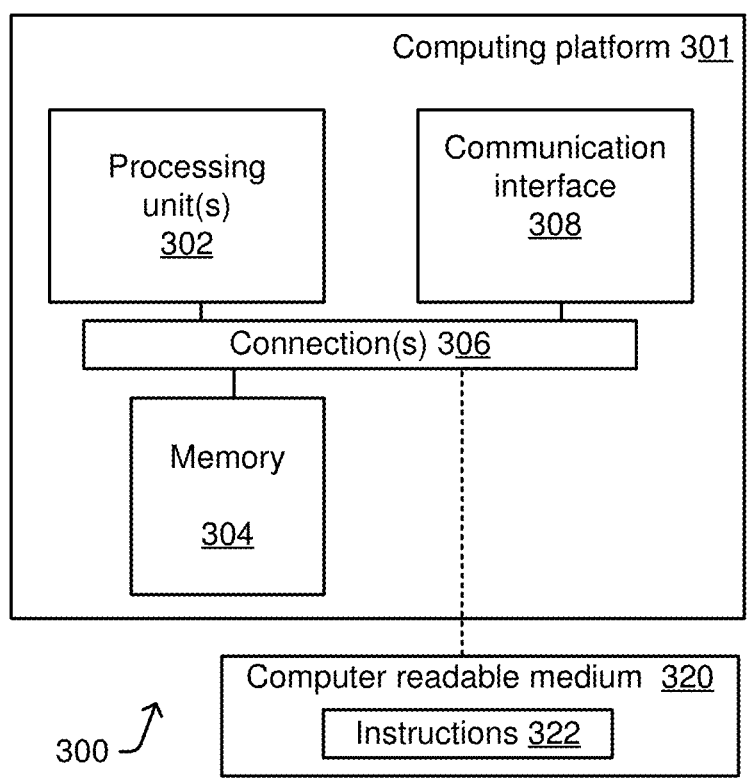
FIG. 3 is a block diagram of a network-based server, as may be used for a crowd source server, a location server, a route/navigation server or other network-based server.

FIG. 3 illustrates a server as a non-limiting example of means for implementing the methods and techniques described herein. Referring to FIG. 3, in an embodiment, the servers 240, 250 and 260 and other network based servers, may use the computing platform 301 embodiment of FIG. 3. The computing platform may comprise one or more processors, here, processing unit(s) (302) comprising one or more general purpose processors, special processors such as graphics processors and/or communications processors or baseband processors. Computing platform 301 will include at least one communication interface 308 to send communications over network 270. The communication interface 308 may comprise a network interface card or cards or other interface for interfacing to an Intranet and/or Internet over network 270. Communication interface 308 may also comprise, in some embodiments, a wireless interface or interfaces such as WAN, WLAN and Bluetooth wireless interfaces. The computing platform may also comprise various memory (304), such as Cache, RAM, ROM, disc, and FLASH memory. In an embodiment, Computing platform 301 may also access computer readable medium 320 such as hard disk drives, tape drives, flash drives and other memory devices.

Figure 4:
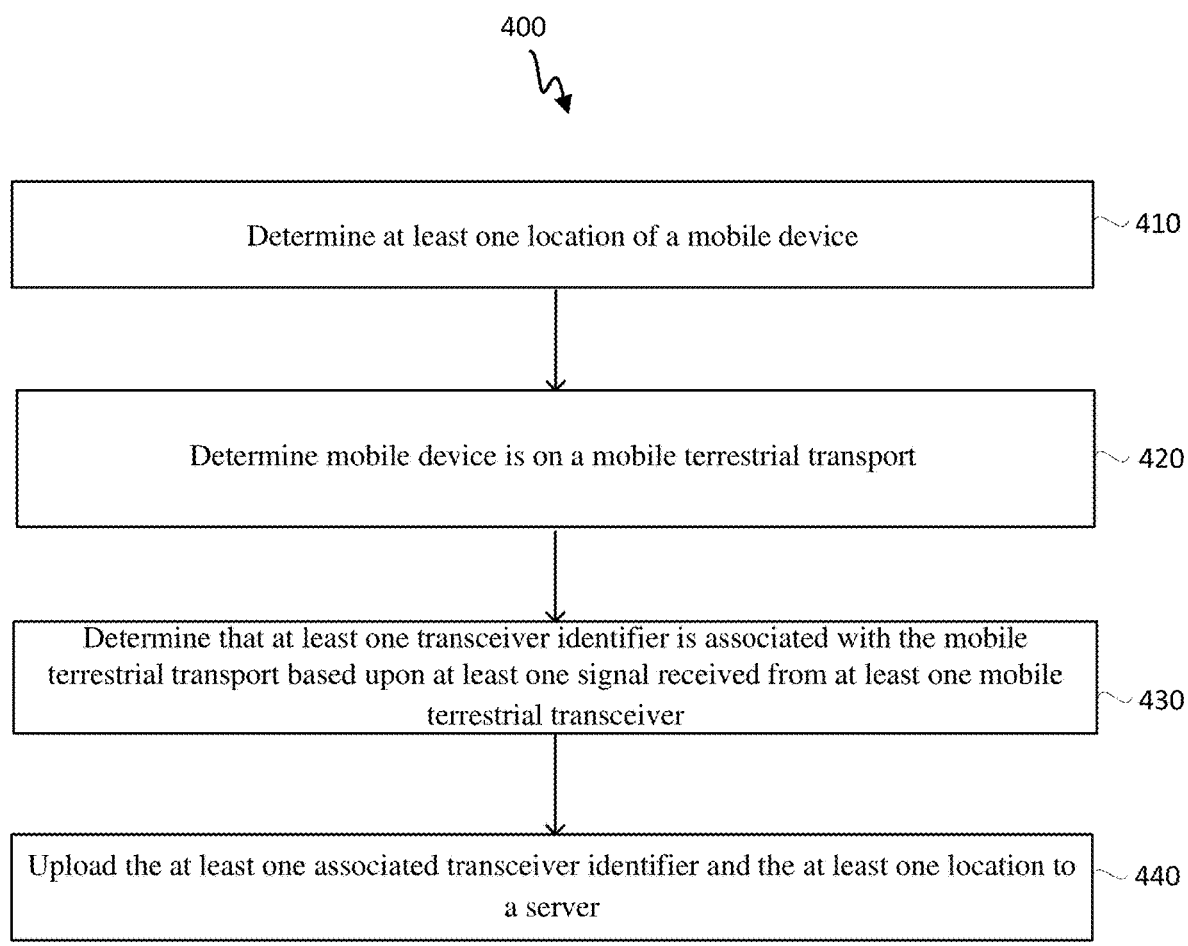
FIG. 4 illustrates an embodiment of a process for crowd sourcing information from a mobile device located on a mobile terrestrial transport.

FIG. 4 illustrates a method and technique for crowd sourcing transport information from a mobile device 100 located on a mobile terrestrial transport 281. The means to implement the methods and techniques of FIG. 4 include, but are not limited to the apparatus and systems of FIGS. 1-3. Referring to FIG. 4, in an embodiment, a mobile device may obtain a transceiver identifier for a mobile terrestrial transceiver 280 co-located on a mobile terrestrial transport 281 with mobile device 100. In an embodiment, mobile device 100 will determine its location while located on mobile terrestrial transport. In some embodiments, the mobile device 100 will determine its location periodically, and communicate locations, while on the transport wirelessly, such as via a WAN wireless connection or via a WLAN wireless connection to crowd source server 250. In an embodiment, mobile device 100 will determine that it is moving by determining its location periodically, or at varying intervals or by measuring doppler off of wireless signals such as WAN, WLAN or GNSS signals. In an embodiment, the mobile device will also determine the ID of visible wireless transceivers, such as WAN and WLAN transceivers, and determine an indication of distance to those transceivers, for example, by measuring received signal strength indications (RSSI) or timing indications (such as time of arrival (TOA) and/or round trip delay (RTD)) or some combination thereof.

In an embodiment, in step 410, the mobile device may determine at least one location the mobile device. Location may be determined through various techniques such as through the use and measurement of GNSS signals, WAN signals, WLAN signals, PAN signals, or some combination thereof. In an embodiment, location may be determined through trilateration of GNSS signals, in conjunction with orbit information such as ephemeris, long term ephemeris, almanac or other orbit information. In an embodiment, location may be determined through trilateration or other method using WAN, WLAN and/or PAN signals in conjunction with location, identification and other information (such as broadcast signal strength, maximum antenna range, communication range, and/or timing offset) as may be downloaded or accessed via, for example, a base station almanac. Assistance data may be provided from a location server 260 or almanac server or other network-based server.

In an embodiment, in step 420, the mobile device determines that it is on a mobile terrestrial transport 281. In an embodiment, the mobile device may compare its immediate history of locations with the route of a mobile terrestrial transport 281 to determine that the mobile device is currently on a transport. In an embodiment, the mobile device may also utilize ticket information, itinerary information and/or calendar and scheduling information to determine that the mobile is on a mobile terrestrial transport 281. In an embodiment, the mobile device may determine that it is at a train, bus or other mobile terrestrial transport 281 depot or station, by comparing its location to known locations of train, bus or other mobile terrestrial transport 281 depots or stations, and determine that the route and/or time of travel away from the station is consistent with a known public transit route and time. In an embodiment, the mobile device may detect a known mobile terrestrial transceiver 280 associated with a mobile terrestrial transport 281 and determine that the mobile device is moving, through location tracking, on a route associated a mobile terrestrial transport 281. In an embodiment, the mobile device may detect a known mobile terrestrial transceiver 280 associated with a mobile terrestrial transport 281 and determine that the mobile device is in proximity to mobile terrestrial transceiver 280, in an example, wherein the mobile device is in proximity (for example, based on signal strength or timing measurements determining that the mobile device is likely to be on mobile terrestrial transport 281) to mobile terrestrial transceiver 280 for an extended period of time, consistent with riding on mobile terrestrial transport 281. In an embodiment, the mobile may utilize various combinations of the above methods to determine that it is on a transport.

In an embodiment, in step 430, the mobile device determines that at least one transceiver identifier is associated with the mobile terrestrial transport 281 based, at least in part, upon at least one signal received from the at least one mobile terrestrial transceiver. In an embodiment, the mobile device may determine that a transceiver identifier is associated with a mobile terrestrial transport 281, that the mobile device is co-located on, by the detection of a wireless signal from a mobile terrestrial transceiver 280, and determining that the signal strength, an indication of distance from the mobile terrestrial transceiver 280, is constant (over time), or constant within a threshold delta signal strength (to account for variations caused by movement within the transport, changes in orientation of the device and in-transport blockages), or that other indications of distance such as round trip delay (RTD), also known as round trip time (RTT) or time of arrival (TOA) are relatively constant within a predetermined threshold, while the mobile device is in motion, as determined through tracking the location of the mobile device over time. In an embodiment, the predetermined threshold may be based upon the difference in signal strength or timing measurements that could be expected via movement of a device within the transport (as opposed to movement of the mobile terrestrial transport 281 itself), changes in device orientation, or movement to a different or closed compartment. In an embodiment, the mobile device 100 may determine that it is moving due to the transient nature of signals from non-mobile transceivers or non-co-located transceivers, such as those specified at a stationary location in a base station almanac, and/or from locations determined therefrom, and may associate the mobile terrestrial transceiver 280 with the mobile terrestrial transport 281 by the relatively constant signal strength or timing measurements derived from the mobile terrestrial transceiver 280, relative to detected non-mobile terrestrial transceivers.

In an embodiment, in step 440, the mobile device uploads an indication for the at least one associated transceiver identifier and the location, to a crowd source server or other network-based server. In an embodiment, one or more associated transceiver identifiers, each from an associated mobile terrestrial transceiver 280, are associated with the mobile terrestrial transport 281, as discussed in step 430. In an embodiment, a time indication is also associated with the location of the mobile device 100 and the one or more associated transceiver identifiers associated with transceivers that are detected at the indicated time. In an embodiment, signal measurements such as signal strength, time of arrival, round trip delay or other indications of distance are also associated with the location of the mobile device 100 at the time indicated uploaded. In an embodiment, the upload, including at least location of the mobile device 100 and associated transceiver identifiers, may occur after each measurement. In an embodiment, the upload, including at least location of the mobile device 100 and associated transceiver identifiers, may be batched and uploaded after longer intervals than the tracking rate. In an embodiment, the upload, including at least location of the mobile device 100 and associated transceiver identifiers, may be batched and uploaded upon the mobile device gaining access to a cooperative WLAN access point, or other data connection, in some embodiments scheduled to occur when the mobile device 100 is charging or not in use. In an embodiment, the upload, including at least location of the mobile device 100 and associated transceiver identifiers, may occur as part of the execution of an informational application such as an application to alert the user of pending stops or of his or her final destination, or of the execution of a mapping application or of a mobile terrestrial transport status application showing the progress of the mobile terrestrial transport 281 along its route.

Figure 5:
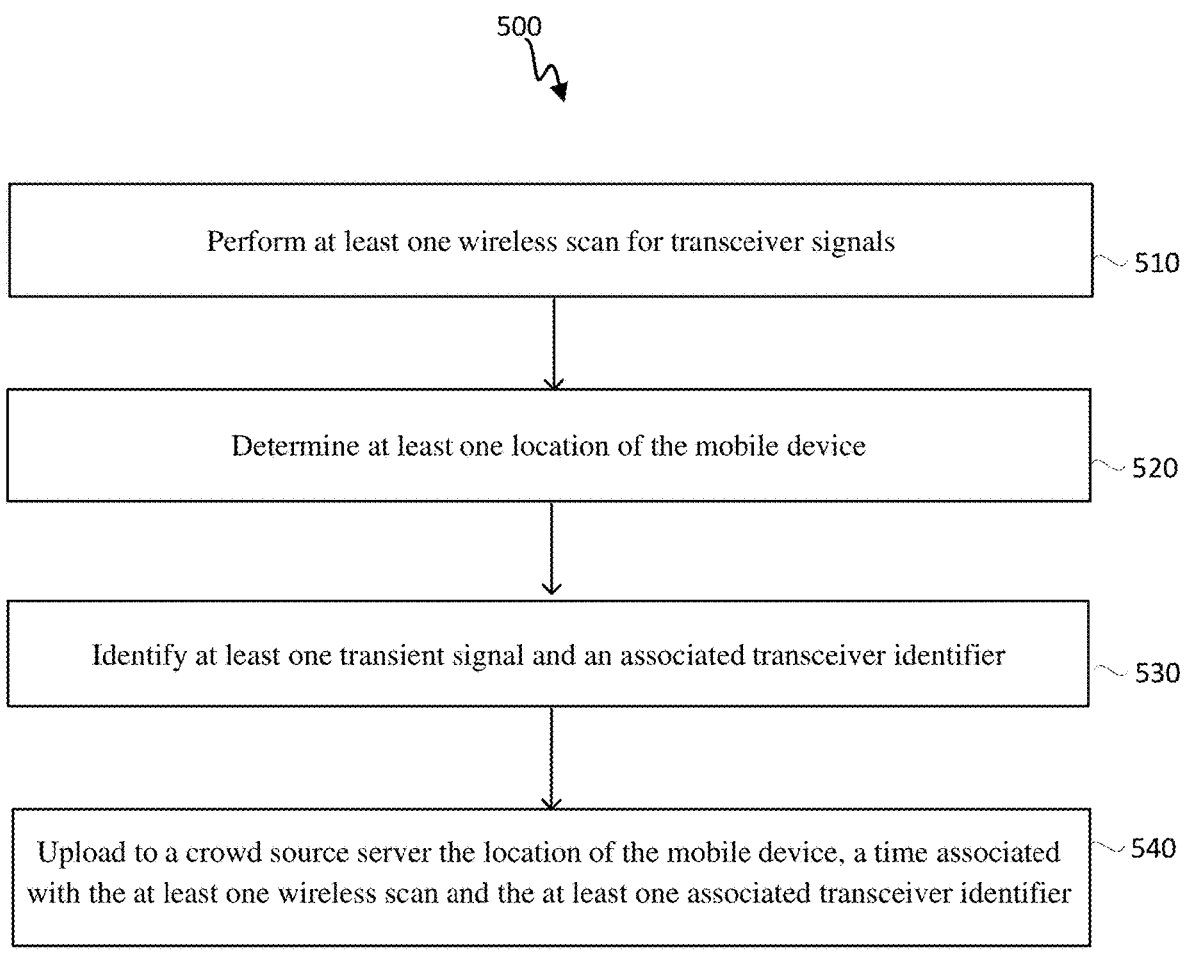
FIG. 5 illustrates an embodiment for a process for crowd sourcing information from a mobile device located at a non-moving location, such as a station, hub, terminal or stop, or at a location along or near to a transit route where signals from a mobile terrestrial transceiver are visible.

FIG. 5 illustrates a method and technique for crowd sourcing transport information from a mobile device 100 located at a non-moving location, such as a station, hub, terminal or stop, or at a location along or near to a transit route where signals from a mobile terrestrial transceiver 280 are visible.

In an embodiment, in step 510, the mobile device performs at least one wireless scan for transceiver signals. In an embodiment, the wireless scan may be across multiple frequencies. In an embodiment, wireless transceivers using different wireless technologies may be detected. In an embodiment, multiple scans may be conducted, some of which are based on different wireless technologies on different networks such as various WAN, WLAN and PAN networks. In an embodiment, scans may comprise a combination of passive and active scans.

In an embodiment, the step 520, the mobile device 100 determines its location at the time of the at least one wireless scan. In an embodiment, the mobile device stores the time of the at least one wireless scan and the location of the mobile device 100 at the time of the at least one wireless scan. In an embodiment, location may be determined using various techniques comprising GNSS and/or trilateration of terrestrial signals comprising WAN, WLAN or PAN or combination thereof, as discussed relative to mobile device 100. Other location techniques may be utilized alone or in combination such as triangulation, dead reckoning, cell sector center and mixed cell sector center. In an embodiment, the mobile device 100 also determines if mobile device 100 is in motion and, if so, at what rate and direction. In an embodiment, the mobile device 100 would include in the upload to a crowd source server, of step 540, an indication that the mobile device was moving at the time that location was determined and the wireless scan was conducted. In an embodiment, the mobile device 100 would include in the upload of step 540, velocity and heading information for mobile device 100.

In an embodiment, in step 530, the mobile device identifies at least one transient signal and an associated transceiver identifier, based at least in part upon the at least one wireless scan. In an embodiment, the determination that a signal from a mobile terrestrial transceiver 280 is transient may be based upon the absence of a signal from mobile terrestrial transceiver 280 in at least some of a plurality of wireless scans taken at the location or at nearby locations. For example, in an embodiment, the mobile device may analyze a plurality of scans taken at the same location (e.g., the mobile device is not moving or has not moved more than a threshold amount. For example, the mobile device is still at the train station or still at a location near the route from which the signals sent by the mobile terrestrial transceiver 280 are visible). The mobile device may determine that a plurality of locations of mobile device are within a threshold distance of each other and analyze and/or compare wireless scans taken at the plurality of location. The mobile device may determine that at least one signal is detected in at least some of the plurality of scans, determined at the plurality of locations and not detected in at least some of the plurality of scans, determined at the plurality of locations, and label the signal as a transient signal.

In an embodiment, in step 530, the determination that a mobile terrestrial transceiver 280 is transient may be based upon signal measurements of a signal, an at least one transient signal, from mobile terrestrial transceiver 280 containing doppler shift (e.g., a frequency shift up or down, based on motion), associated with relative motion of the mobile terrestrial transceiver 280 to mobile device 100, in a wireless scan taken at a location or at nearby locations. In an embodiment, the frequency shift (doppler shift), and an indication of distance such as signal strength or timing measurements, for example, measured at multiple locations, may be used to determine the location of the mobile terrestrial transceiver 280 and the approximate direction of movement (e.g., as general as approaching or receding or as accurate as actual heading). In an embodiment, the frequency shift (doppler shift), and an indication of distance, such as signal strength or elapsed time, for example, measured at a single location, and combined with route information for a nearby mobile terrestrial transport 281, may be used to determine the location of the mobile terrestrial transceiver 280 and the approximate direction of movement (e.g., as general as approaching or receding or as accurate as actual heading). The determined location of the mobile terrestrial transceiver 280 may be compared to location predicted by the known route of a mobile terrestrial transport 281 for consistency. Also, the determined direction or heading and/or velocity of the mobile terrestrial transceiver may be compared to the expected direction and/or expected speed of mobile terrestrial transport 281 to verify that the estimated velocity or general direction (approaching or receding, for example) of the transport, based on known route and signal strength, are consistent with expected values for location, heading and/or velocity. If the heading and/or approximate direction, and/or velocity and/or location are outside of expected boundaries for a known mobile terrestrial transport 281, the data uploaded in step 540 may also contain an indication of potentially anomalous readings or, in an embodiment, the upload in step 540 may be cancelled or may not include the information in regards to the anomalous mobile terrestrial transceiver 280.

In an embodiment, in step 530, the determination that the signal is transient may be based upon the absence of the transceiver which is the source of the transient signal from a base station almanac of transceivers at the location of the mobile device 100 or on an indication, in a base station almanac of transceiver, that the transceiver is transient (e.g., from a moving signal source). For example, the transient signal may be based upon the transceiver, which is the source of the transient signal, being categorized or otherwise labeled as a mobile terrestrial transceiver 280 in a base station almanac of transceivers, the base station almanac of transceivers being, in some embodiments, containing transceivers visible at the location of the mobile device 100.

In an embodiment, a base station almanac of transceivers comprises transceiver identification information, transceiver location and, in some embodiments, transmission signal strength, time or time offset, and signal type. In an embodiment, a transceiver may be associated with an indication that it is a mobile terrestrial transceiver 280. In an embodiment, a transceiver, indicated as a mobile terrestrial transceiver 280 may be associated with route and schedule or time information for a mobile terrestrial transport 281. In an embodiment, a transceiver may be associated with a mobile terrestrial transport 281 identifier. In an embodiment, a base station almanac may be downloaded to the mobile device 100, stored on the mobile device 100, arranged into tiles or based on the location of the mobile device 100. In an embodiment, the transient signal may be identified based on increasing signal strength as the mobile terrestrial transport 281 approaches and decreasing signal strength as the mobile terrestrial transport 281 leaves the area.

In an embodiment, in step 540, the mobile device 100 uploads, to a crowd source server, the location of the mobile device 100, time of the at least one wireless scan and the at least one associated transceiver identifier. In an embodiment, the mobile device 100 may also upload an indication range (e.g., signal strength, time of arrival, round trip time, and/or elapsed signal time) to the mobile terrestrial transceiver 280, as designated by the transceiver identifier associated with the at least one transient signal. In an embodiment, the mobile device may also upload an at least one frequency measurement of the at least one transient signal. In an embodiment, the at least one frequency measurement of the at least one transient signal may be utilized to determine if the mobile terrestrial transport 281 is approaching or receding and/or the velocity and/or heading of the mobile terrestrial transport. In an embodiment, in addition to the location of mobile device 100, the route information for mobile terrestrial transport 281 is also utilized in estimating the location, velocity and/or heading of mobile terrestrial transport 281. In an embodiment, the mobile device 100 uploads a plurality of transceiver identifiers detected in the at least one wireless scan. In an embodiment, the mobile device 100 includes an indication that a transceiver identifier is a transient signal in the upload. In an embodiment, each scan is associated with a time of scan and a set of transceiver identifiers detected by the respective scan, and the location of the mobile device 100 when the scan was conducted. In an embodiment, an indication of distance, such as a physical estimate (meters, feet, etc.), signal strength, or elapsed time, is associated with each detected transceiver for each scan. In an embodiment, the information is uploaded to a crowd source server 250 or other network server. In an embodiment, the crowd source server 250 determines the identity of the mobile terrestrial transceiver 280. In an embodiment, the mobile device 100 determines the identity of the mobile terrestrial transceiver 280. In an embodiment, the crowd source server 250 determines the location of the mobile terrestrial transport 281 based upon the uploaded information. In an embodiment, the crowd source server 250 determines the location of the mobile terrestrial transport 281 by extrapolating based upon uploaded location and time information and velocity estimates. In an embodiment, the crowd source server 250 may also consider historical time, location and speed data in estimating the location of mobile terrestrial transport 281.

Figure 6:
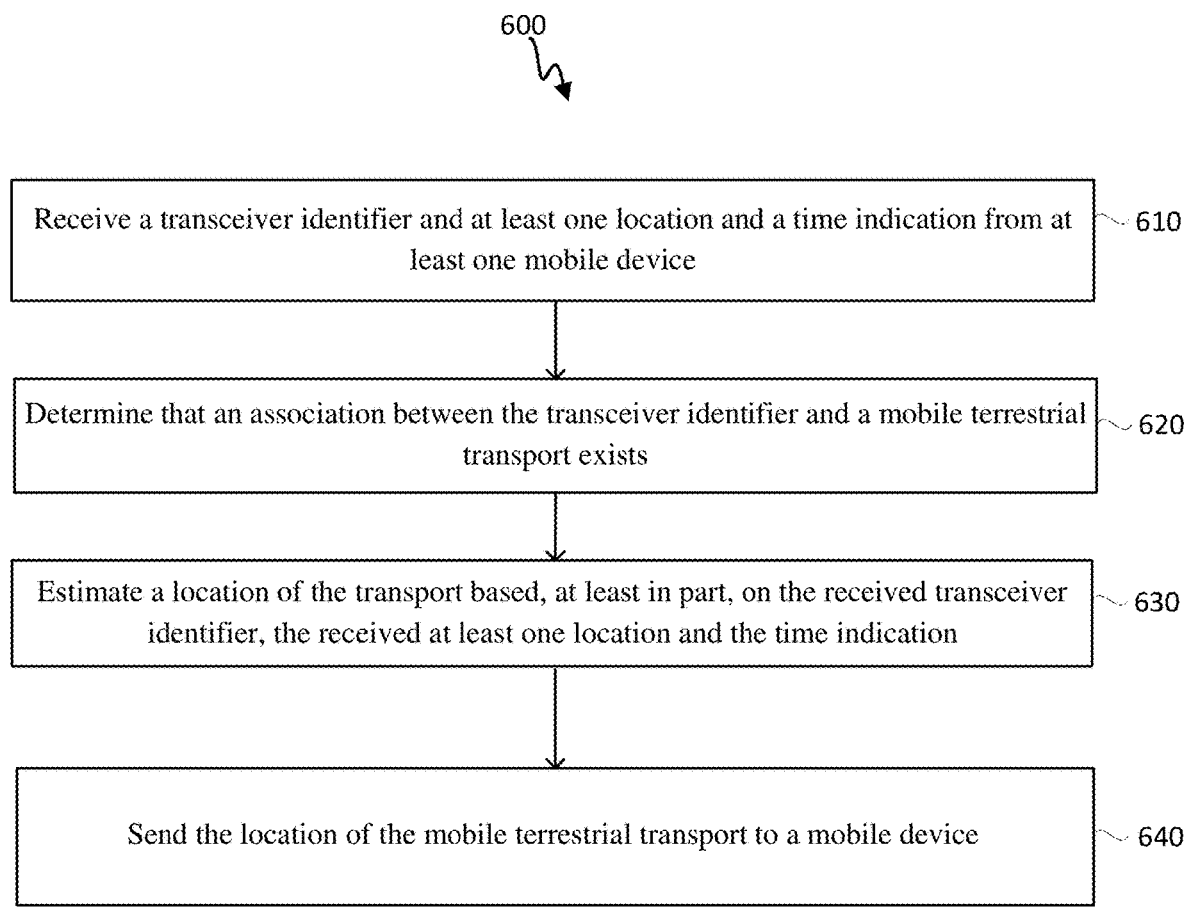
FIG. 6 illustrates an embodiment for determining the location of a transport and sending the location of the transport to a mobile device.

FIG. 6 illustrates a method and technique, on a crowd source server 250, for determining the location of a transport and sending the location of the transport to a mobile device 100. A crowd source server 250 receives uploaded information from mobile devices 100 and determines, based on a comparison of mobile device 100 location and time data and known route information and schedule information, that a mobile device 100 is located on a mobile terrestrial transport 281. Based upon the location of the mobile device 100, the location of mobile terrestrial transport 281 may be extrapolated and shared with mobile devices, for example, via transportation and map information applications.

In step 610, the crowd source server 250 receives a transceiver identifier and at least one location and a time indication from at least one mobile device 100. In an embodiment, the crowd source server may receive a plurality of transceiver identifiers associated with a location of a mobile device 100 when the scan was taken to detect transceiver identifiers, at least some of which may be stationary (non-mobile) transceivers. In an embodiment, a transceiver identifier associated with a mobile terrestrial transceiver 280 may be indicated or otherwise labeled. In an embodiment, the crowd source server 250 may also receive indications of distance between the mobile device 100 and any given transceiver, and other information, as has been discussed in regards to FIGS. 4 and 5.

In step 620, the crowd source server 250 determines that an association between the transceiver identifier and a mobile terrestrial transport 281 exists. The association may be determined based upon a comparison of public scheduling and route information and location and time data received from mobile devices 100. It is expected that route data should match sequential location data received from mobile device 100 and that time data, associated with the location data can both be utilized to extrapolate or otherwise predict the current location of a mobile terrestrial transport 281 and to identify delay or ahead of schedule conditions. In an embodiment, if the route data does not match the received time and location data, a reliability estimate of the time and location data may be lowered. In an embodiment, if the route data does not match the received time and location data, map and traffic data may be analyzed to explain route deviation and/or alerts may be sent out to users, police, and/or mass transit authorities. It is further understood that, once a mapping between a transceiver identifier and a mobile terrestrial transport 281 and/or a route is made, that mapping may be utilized to determine the location of a mobile terrestrial transport 281 along its route without re-determining the mapping for each set of data.

In step 630, in an embodiment, the crowd source server 250 estimates a location of the transport based, at least in part, on the received transceiver identifier, the received at least one location and the time indication. Based upon the mapping between a transceiver identifier, in step 620, and a mobile terrestrial transport 281, the location of a mobile device 100 may be associated with the location of a mobile terrestrial transport 281. Furthermore, based on the time associated with each location received from mobile device 100, the location of the mobile terrestrial transport may be extrapolated or otherwise predicted to current locations and to future locations. In an embodiment, historical data relating to speed along segments of the route, in an embodiment, as measured at various times may be utilized to extend locations forward more accurately than mere extrapolation by predicting the amount of time to traverse different route segments at the designated time of day.

In step 630, in an embodiment, the crowd source server 250 sends the location of the mobile terrestrial transport 281 to a mobile device 100, via an information server such as a map server or an application server, such as a transit status server or transit alert server. The mobile device 100 would receive the location of the mobile terrestrial transport 281 indirectly as part of a map or as part of a set of alerts relative to predicted times of arrival at different stations and/or times of arrival at a final destination.

Figure 7:
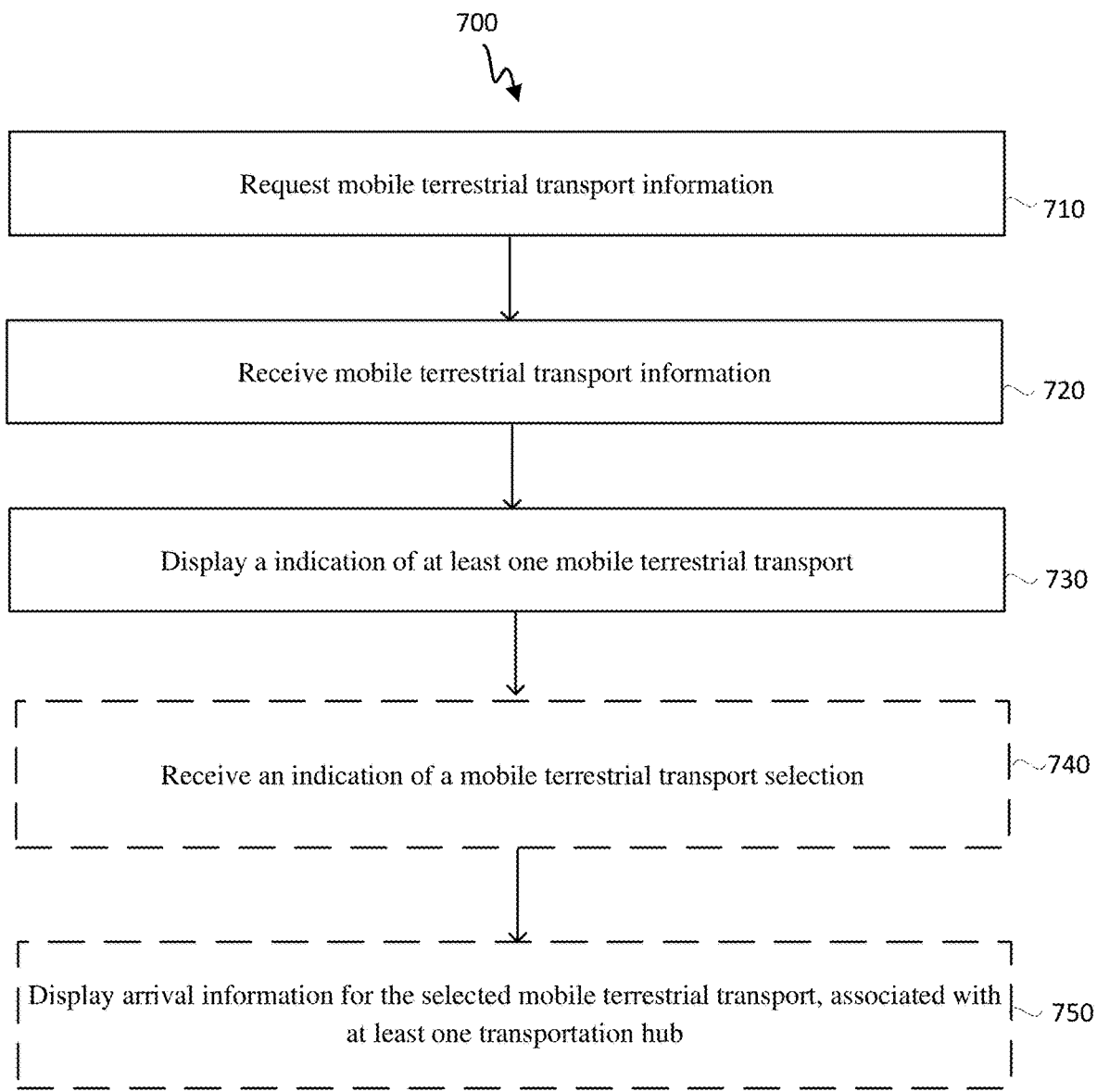
FIG. 7 illustrates an embodiment of a process for receiving and displaying mobile transport information on a mobile device.

FIG. 7 illustrates a method and technique for receiving and displaying mobile transport information on a mobile device. It is understood that other embodiments may be utilized to retrieve and display mobile terrestrial transport 281 information.

In step 710, the mobile device 100 requests mobile terrestrial transport information, either from an application server, such as an application server that provides schedule information or alerts for arrival departure or pending arrival or impending final destination or various combinations thereof, or from directly from an application on mobile device 100 to the crowd source server or to an information server. It is understood that, in an embodiment, an application server may obtain the route and schedule data and predictions from the crowd source server.

In step 720, the mobile device 100 receives mobile terrestrial transport 281 information, comprising information regarding the location of at least one mobile terrestrial transport 281, the location of the at least one mobile terrestrial transport 281 along its route, and estimated time ahead or behind schedule. In an embodiment, the schedule delay information may vary based on stop. Also, in an embodiment, the arrival and/or departure times and delay information may be customized based on the location of the requesting mobile device 100 and the closest transit stop or depot.

In step 730, the mobile device 100 displays an indication of at least one mobile terrestrial transport. In an embodiment, the mobile terrestrial transports 281 displayed may be based on a particular station or depot or a particular time period or both. For example, the mobile device 100 may display the information for mobile terrestrial transports 281 scheduled to arrive within a particular period of time (next two hours, during the current day, etc.) at the closest or most convenient or designated transit hub or stop.

In optional step 740, the mobile device receives an indication of a mobile terrestrial transport selection. In an embodiment, the indication may be received from a user interface, such as a touch screen. In an embodiment, the indication may comprise a selection of one or more a list of mobile terrestrial transports 281 arriving at a selected station or hub, such as via touch selection via a touch screen, or via a keypad or via a virtual keypad.

In optional step 750, the mobile device displays arrival information for the selected terrestrial transport, associated with at least one transportation hub. In an embodiment, the arrival information may be displayed in a text display. In an embodiment, the arrival information may be displayed on a map, with arrival information being associated with each stop along the route for the selected terrestrial transport. In an embodiment, a map may be displayed illustrating the estimated position of the mobile terrestrial transport 281. In an embodiment, the estimated position of the mobile terrestrial transport 281 may be updated automatically, such that an indicator for the mobile terrestrial transport 281 moves along its route on a map, as illustrated in FIG. 8

Figure 8:
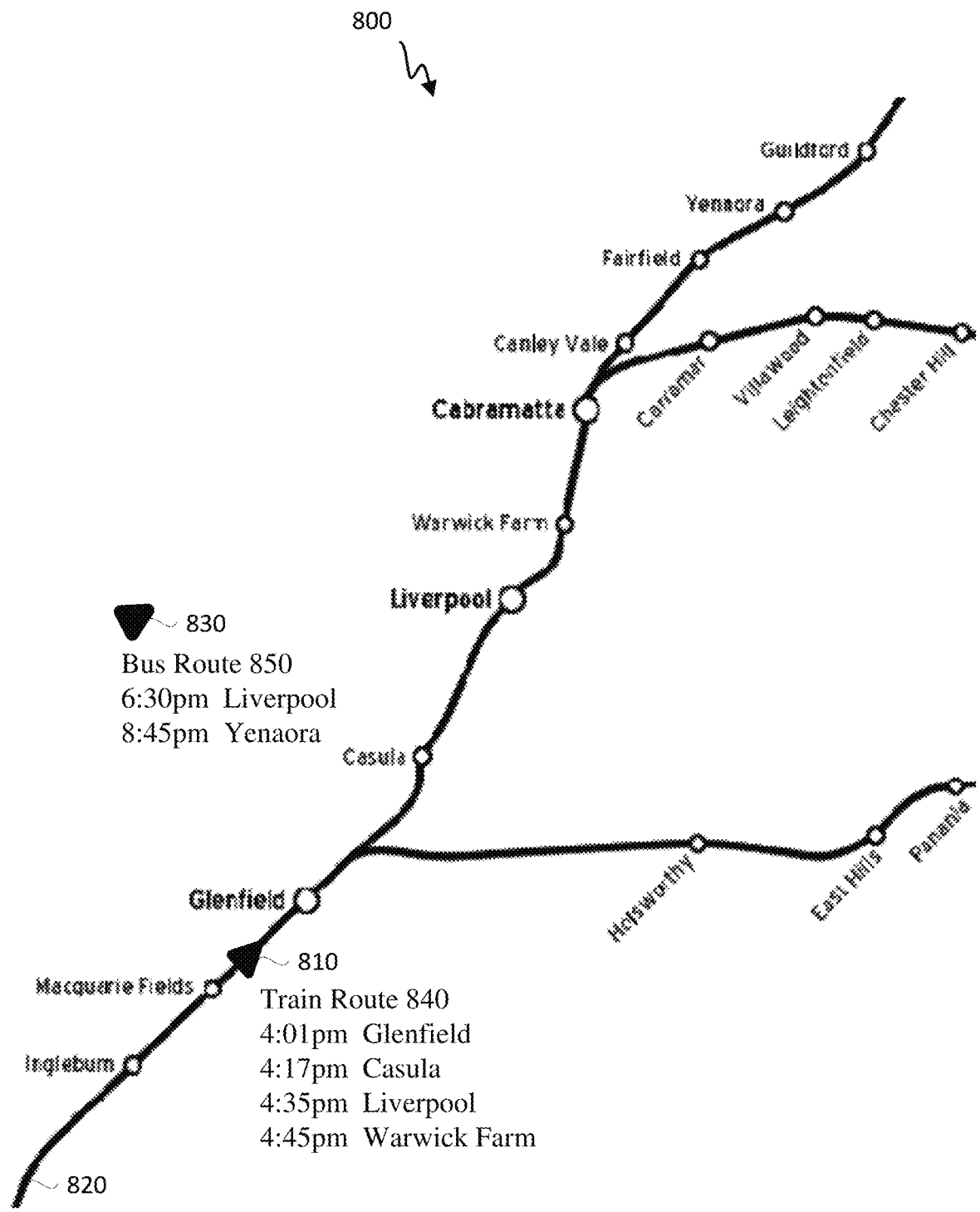
FIG. 8 illustrates an example embodiment for a map indicating the location of at least one transport.

FIG. 8 illustrates an embodiment of a display of mobile terrestrial transport 281 location on a map, each mobile terrestrial transport 281 indicator being accompanied by arrival times at upcoming stops for that mobile terrestrial transport 281. 820 illustrates a train system with stops indicated as circles along the route. Train 810 is an example of an icon designating the location of the mobile terrestrial transport 281, in this case, a train 810 on train route 840 which runs on the train system 820. The times of arrival for Glenfield, Casula, Liverpool and Warwick Farm are displayed next to the icon designating the location of the mobile terrestrial transport 281 (here, train 810) along train route 840. It is understood that the times of arrival would track with the indicator for train 810 along train route 840. 830 illustrates an icon designating the location of the mobile terrestrial transport 281, in this case a bus 830, along bus route 850. Again, the scheduled stops for bus route 850 are displayed next to the icon for the bus. The street map has been left out for simplicity of illustration; however, in some embodiments, both the train route 840 and the bus route 850 may be outlined or overlaid onto a street map and the different routes or transit types may have color coded or otherwise differentiated routes.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long Term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-

AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home. In such an implementation, one or more mobile devices may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Galileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of crowdsourcing on a mobile device, comprising:
    performing, by the mobile device, at least wireless scan for transceiver signals, the transceiver signals comprising at least one transient signal;
    determining, by the mobile device, at least one location of the mobile device;
    determining, by the mobile device, a plurality of distance measurements, between the mobile device and the mobile terrestrial transport, of the at least one transient signal;
    determining, by the mobile device, the at least one transient signal and an at least one associated transceiver identifier associated with a mobile terrestrial transport based, at least in part, upon the plurality of distance measurements_of the at least one transient signal; and
    uploading to a crowd source server, by the mobile device, the at least one location of the mobile device, a time associated with the at least one wireless scan, and the at least one associated transceiver identifier associated with the mobile terrestrial transport.

2. The method of crowdsourcing on the mobile device of claim 1, wherein each scan of the at least one wireless scan for transceiver signals is associated with one of the at least one location of the mobile device.

3. The method of crowdsourcing on the mobile device of claim 1, wherein determining the at least one transient signal and the at least one associated transceiver identifier comprises:
    analyzing, on the mobile device, a plurality of scans of the at least one wireless scan;
    determining that a plurality of locations of the at least one location of the mobile device are within a threshold distance of each other; and
    determining that at least one signal is detected in at least one of the plurality of scans, determined at the plurality of locations, and is not detected in at least one of the plurality of scans,
    determined at the plurality of locations.

4. The method of crowdsourcing on the mobile device of claim 1, wherein determining the at least one transient signal and the at least one associated transceiver identifier comprises:
    determining an indication of distance between a mobile terrestrial transceiver and the mobile device and an indication of approximate direction of the mobile terrestrial transceiver; and
    determining consistency between the indication of distance between the mobile terrestrial transceiver and the mobile device, the indication of approximate direction of the mobile terrestrial transceiver, and a predicted location and a heading of the mobile terrestrial transport based on known route information.

5. The method of crowdsourcing on the mobile device of claim 1, wherein determining the at least one transient signal and the at least one associated transceiver identifier comprises:
    receiving a base station almanac; and
    determining that the at least one transient signal is identified in the base station almanac as a transient signal.

6. A mobile device for crowdsourcing, comprising:
    one or more processing units; and
    a wireless transceiver communicatively coupled to the one or more processing units, the one or more processing units configured to:
        perform at least one wireless scan for transceiver signals, the transceiver signals comprising at least one transient signal;
        determine at least one location of the mobile device;
        determine, a plurality of distance measurements, between the mobile device and the mobile terrestrial transport, of the at least one transient signal;
        determine the at least one transient signal and an at least one associated transceiver identifier associated with a mobile terrestrial transport based, at least in part, upon the plurality of distance measurements of the at least one transient signal; and
        upload the at least one location of the mobile device, a time associated with the at least one wireless scan and the at least one associated transceiver identifier associated with the mobile terrestrial transport.

7. The mobile device of claim 6, wherein each scan of the at least one wireless scan for transceiver signals is associated with a location of the at least one location of the mobile device.

8. The mobile device of claim 6, wherein the one or more processing units configured to determine the at least one transient signal and the at least one associated transceiver identifier comprise the one or more processing units configured to:
    analyze, on the mobile device, a plurality of scans of the at least one wireless scan;
    determine that a plurality of locations of the at least one location of the mobile device are within a threshold distance of each other; and
    determine that at least one signal is detected in at least one of the plurality of scans, determined at the plurality of locations, and is not detected in at least one of the plurality of scans,
    determined at the plurality of locations.

9. The mobile device of claim 6, wherein the one or more processing units configured to determine the at least one transient signal and the at least one associated transceiver identifier comprise the one or more processing units configured to:
    determine an indication of distance between a mobile terrestrial transceiver and the mobile device and an indication of approximate direction of the mobile terrestrial transceiver; and determine consistency between the indication of distance between the mobile terrestrial transceiver and the mobile device, the indication of approximate direction of the mobile terrestrial transceiver, and a predicted location and a heading of the mobile terrestrial transport based on known route information.

10. The mobile device of claim 6, wherein the one or more processing units configured to determine the at least one transient signal and the at least one associated transceiver identifier comprise the one or more processing units configured to:
    receive a base station almanac; and
    determine that the at least one transient signal is identified in the base station almanac as a transient signal.

11. A means for crowdsourcing on a mobile device, comprising:
    means for performing at least one wireless scan for transceiver signals, the transceiver signals comprising at least one transient signal;
    means for determining at least one location of the mobile device;

means for determining a plurality of distance measurements, between the mobile device and the mobile terrestrial transport, of the at least one transient signal;

means for determining the at least one transient signal and an at least one associated transceiver identifier associated with a mobile terrestrial transport based, at least in part, upon the plurality of distance measurements of the at least one transient signal; and means for uploading the at least one location of the mobile device, a time associated with the at least one wireless scan and the at least one associated transceiver identifier associated with the mobile terrestrial transport.

12. The means for crowdsourcing on the mobile device of claim 11, wherein each scan of the at least one wireless scan for transceiver signals is associated with a one of the at least one location of the mobile device.

* * * * *